(12) United States Patent
Ejima

(10) Patent No.: US 9,819,047 B2
(45) Date of Patent: Nov. 14, 2017

(54) ASSEMBLED BATTERY

(71) Applicant: Panasonic Intellectual Property Management Co., Ltd., Osaka (JP)

(72) Inventor: Tsuneyuki Ejima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/317,712

(22) PCT Filed: Apr. 13, 2016

(86) PCT No.: PCT/JP2016/001995
§ 371 (c)(1),
(2) Date: Dec. 9, 2016

(87) PCT Pub. No.: WO2016/166972
PCT Pub. Date: Oct. 20, 2016

(65) Prior Publication Data
US 2017/0133706 A1    May 11, 2017

(30) Foreign Application Priority Data

Apr. 16, 2015 (JP) ................................. 2015-083826

(51) Int. Cl.
*H01M 2/10* (2006.01)
*H01M 10/04* (2006.01)
(52) U.S. Cl.
CPC ..... *H01M 10/0481* (2013.01); *H01M 2/1077* (2013.01); *H01M 2220/20* (2013.01)

(58) Field of Classification Search
CPC .......... H01M 2/1077; H01M 10/0481; H01M 2220/20
See application file for complete search history.

(56) References Cited

U.S. PATENT DOCUMENTS 5,663,008 A    9/1997 Shimakawa et al.
2005/0285567 A1    12/2005 Kim

FOREIGN PATENT DOCUMENTS

| JP | 8-250151 | 9/1996 |
|---|---|---|
| JP | 2006-012841 | 1/2006 |
| JP | 2010-092610 | 4/2010 |
| JP | 2012-059581 | 3/2012 |
| WO | 2013/146561 | 10/2013 |
| WO | WO 2013-146561 | * 10/2013 |

OTHER PUBLICATIONS

International Search Report of PCT application No. PCT/JP2016/001995 dated Jun. 21, 2016.

* cited by examiner

*Primary Examiner* — Brittany Raymond
(74) *Attorney, Agent, or Firm* — Panasonic IP Management; Kerry S. Culpepper

(57) ABSTRACT

In a state where battery cells (2) are sandwiched from both ends by a pair of end plates (3) comprising a plurality of plates, the pair of end plates (3) are secured by metal bands (4). The end plates (3) are secured by bolts to a base, at the inside end of the plates as seen from the battery cells (2). Then, elongation of the assembled battery (1) can be kept to a small range, even when the battery cells (2) are swollen.

6 Claims, 10 Drawing Sheets

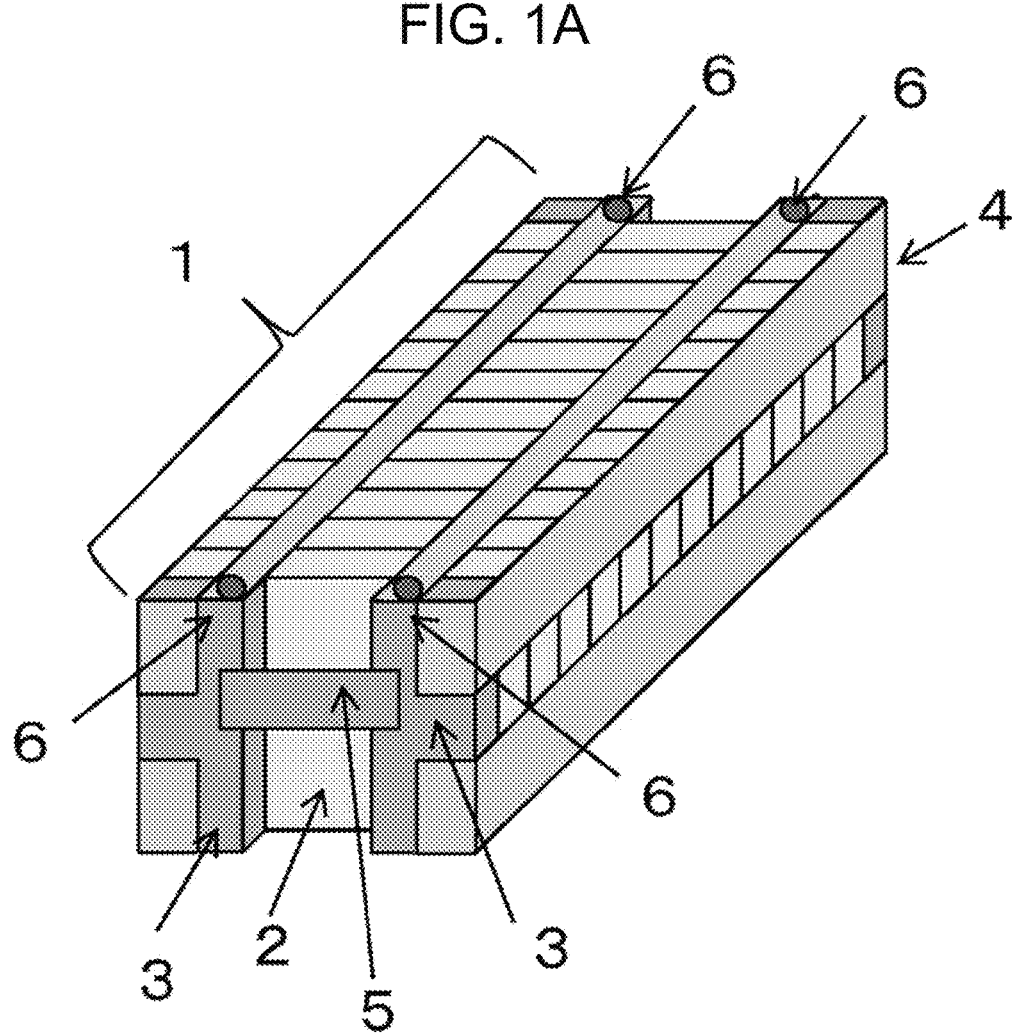

ASSEMBLED BATTERY

CROSS-REFERENCE TO RELATED APPLICATIONS

This application is a U.S. national stage application of the PCT International Application No. PCT/JP2016/001995 filed on Apr. 13, 2016, which claims the benefit of foreign priority of Japanese patent application No. 2015-083826 filed on Apr. 16, 2015, the contents all of which are incorporated herein by reference.

TECHNICAL FIELD

The present invention relates to an assembled battery.

BACKGROUND ART

An assembled battery configured of a plurality of lithium ion secondary batteries, is supplied with electrical energy outside the batteries when the remaining capacity becomes small. Namely, the assembled battery can be used repeatedly as a power source by storing electrical energy inside the batteries through charging.

As a charging method of the assembled battery, for example, an electric vehicle is charged by a charging stand exclusive therefor. Recently, the electric vehicle is also charged through a home outlet. Other than these, power supply methods at charging are known. Especially, a hybrid vehicle stores generated electric power through a generator which is operated by using motive power of a driving engine.

Recently, in the hybrid vehicle, the vehicle which is charged from a home outlet at parking is developed. Further, the vehicle can be charged by regenerative power generation at deceleration. A storage battery is mainly charged by electric power generated from renewable energy such as solar power generation, or wind power generation.

In the conventional assembled battery, the structure is known where a plurality of battery cells are arranged in series, and the periphery thereof is held by plate-shape members (refer to Patent Literature 1).

FIG. 6 shows a figure showing the conventional assembled battery described in Patent Literature 1.

In FIG. 6, a plurality of battery cells 2 are arranged at predetermined intervals in a stacked state such that large surfaces of the battery cells face each other. At both ends thereof, end plates 3 are disposed, and the two end plates are held by holder members 9 which face the side surfaces of battery cells 2. Battery cells 2 are swollen during charge-discharge, and then spaces between the cells or between the cells and the end plates become small. In order to suppress this, space maintaining members 10 are continuously connected in parallel.

CITATION LIST

Patent Literature

Patent Literature 1: Japanese Laid-Open Patent Publication No. 2012-059581

SUMMARY OF THE INVENTION

Technical Problem

As represented by the assembled battery described in the above Patent Literature 1, the swells of lithium ion secondary batteries during operation cannot be avoided. In a case where it is necessary to confine the size within a predetermined size, it is necessary that deformation of battery cell 2 due to the swell is made small, or elongation of the whole assembled battery is suppressed as a countermeasure. In many cases, the latter is carried out.

In the above conventional assembled battery, spacers each having a bar-shape are continuously connected for a purpose of suppressing the swells of the battery cells. It is better that a number of the bar-shaped spacers disposed between the adjacent battery cells or between the battery cells and the end plates is bigger. The swell amount has a relationship to the capacity of the battery, and then when the capacity is small, the swell amount is also small. Thus, the method or structure in the above Patent Literature 1 is effective.

However, recently, the higher capacity of the battery is required for the vehicle, and the swell amount of the battery cell becomes bigger. In this case, it is difficult that spaces between the battery cells are kept. Additionally, the bar-shaped spacers constrain the swells of the battery cells, and the whole assembled battery is elongated by reaction force generated from constraining.

Especially, in the vehicle use, a mounted space of the battery is limited. In a case where the size of the assembled battery is elongated, it may interfere with parts at the periphery. Accordingly, during operation of the battery, it is preferable that elongation of the assembled battery is small.

The present invention is to resolve the problem of the above conventional art, and has a purpose for providing an assembled battery of which the elongation can be suppressed as a whole even in a case where the battery cells are swollen.

Solution to Problem

To achieve the above purpose, an assembled battery of the present invention has the following structure, a plurality of battery cells are arranged in series such that long side surfaces of the battery cells face each other, and both ends thereof are sandwiched by end plates which are each divided in small plates, and end plate end parts other than four corners in each end plate of the assembled battery, that is, at inner side of positive and negative terminals, are connected by metal bands.

Advantageous Effects of Invention

According to an assembled battery of the present invention, even when battery cells having a high capacity are used, reaction force due to swells of battery cells can be relaxed, and elongation of the assembled battery can be suppressed to small degree

BRIEF DESCRIPTION OF DRAWINGS

FIG. 1A is a view showing an assembled state of an assembled battery relating to an embodiment 1 of the present invention.

DESCRIPTION OF EMBODIMENTS

The embodiments of the present invention will be explained, referring to figures, in the following.

Embodiment 1

Figure 1B:
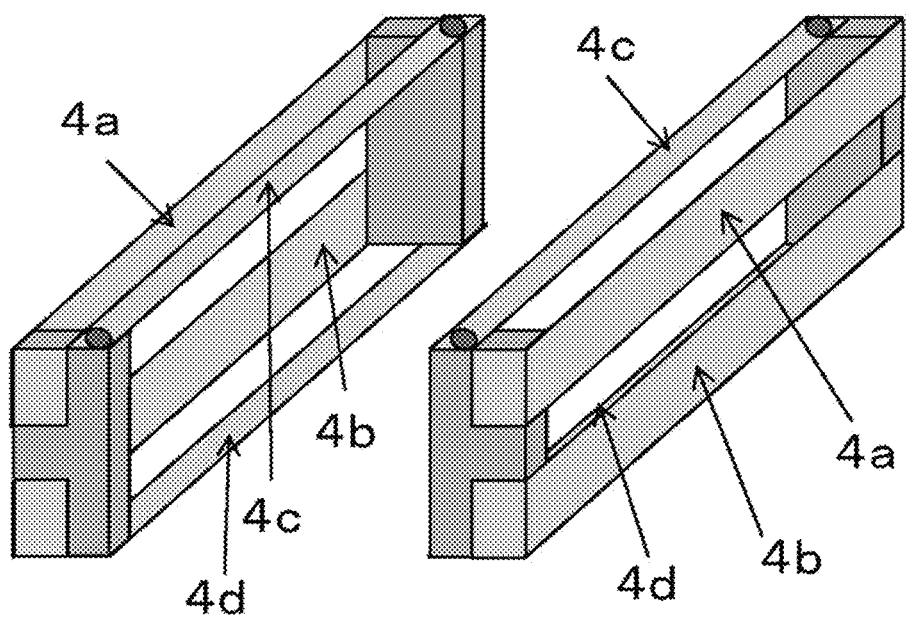
FIG. 1B is a view showing configurational parts except for battery cells in the assembled battery relating to the embodiment 1 of the present invention.
Figure 1C:
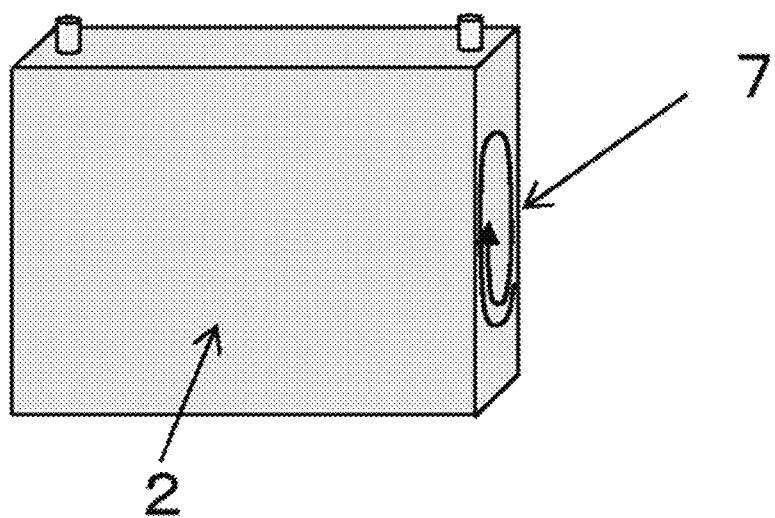
FIG. 1C is a view showing battery cells of the assembled battery relating to the embodiment 1 of the present invention.
Figure 6:
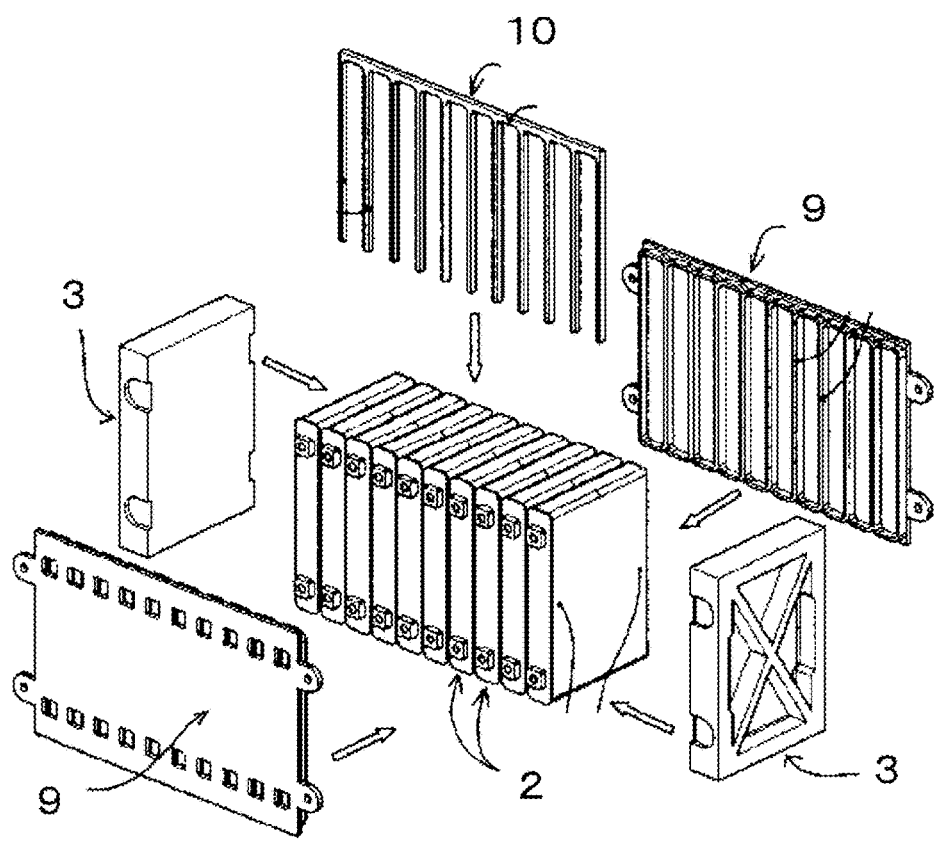
FIG. 6 is a view showing a battery block of a conventional assembled battery described in Patent Literature 1.

FIGS. 1A to 1C are figures showing the whole of an assembled battery relating to an embodiment 1 of the present invention. In FIGS. 1A to 1C, the same configurations as FIG. 6 will be assigned with the same reference numerals, and description thereof will be omitted.

In FIGS. 1A to 1C, assembled battery 1 is configured of battery cells 2, end plates 3, metal bands 4, and connecting member 5. FIG. 1A shows an assembled state of assembled battery 1, and FIG. 1B shows configurational parts except for battery cells 2, and FIG. 1C shows battery cells 2.

Battery cell 2 is gradually swollen in the process in which charge and discharge are repeated during use. This is caused from the following reason.

In the manufacturing process of battery cells 2, electrode material is coated on a metal foil, and is dried. Further, such electrode foils are wound in a state where the electrode foils are compressed in the thickness direction. Then, the wound electrode foils are sealed with electrolyte inside a cell can. In the using state of the battery, the electrode materials are swollen by heat generation due to chemical reaction of the electrodes or Joule heat. At early stage of the life, the swollen material returns to original state in due course of time. Then, remaining stress generated in the compressing process during manufacturing, is gradually released. Further, thickness of the electrode is increased by repeated charge and discharge, and also the whole of the battery cell is increased.

When the thickness of the electrode continues to increase, buckling of the electrode occurs by receiving compressing force due to the constraining by the cell can. The electrolyte at the space where the buckling occurs, vaporizes even at room temperature. Then, as the temperature is increased, the volume is increased, and then the thickness of the battery cell is increased according to this.

As shown in FIG. 1C, electrode terminals are disposed on the upper surface of battery cell 2, and the wound electrode is stored at a posture where the axis of the wound electrode is disposed in parallel with the direction of the long size in the rectangular parallelepiped battery (prismatic battery) in a spiral state as shown by arrow 7. In this state, the wound electrode assembly is scarcely swollen in the direction of the winding axis. Since there is a space between the wound electrode assembly and the top part of the cell can in the vicinity of the upper surface having the terminals of battery cell 2, the upper surface of battery cell 2 is scarcely swollen in the outer appearance even during operation. Battery cell 2 is swollen in a direction perpendicular to the large area surface (width direction).

In this way, during use, increasing the width due to the swell in the lithium ion secondary batteries cannot be avoided. Especially, in the vehicle use, a mounted space of the battery is limited. Since parts or structures other than the battery are disposed near the battery, when the size change of the battery becomes large, it may interfere with parts at the periphery. Therefore, it is necessary that the size change of assembled battery 1 is kept in the minimum.

As countermeasures against it, there are two ways. The one way is that hardness of the structure members is made big by making the sizes of the structure members constituting assembled battery 1 big, or by using the structure members having high Young's modulus. The other way is that reaction force generated in the configurational member due to the swell of battery cell 2 is relaxed. As the assembled battery becomes big and heavy, the former way is not preferable as the vehicle use which requires down-sizing or weight-saving.

The assembled battery shown in FIG. 1A, has the structure where increasing the size or weight is suppressed as much as possible. The plurality of battery cells 2 are arranged in series such that large surfaces of the battery cells face each other. The pair of end plates 3 are disposed at both ends thereof. Each of the pair of the end plates is configured of two small plates. Each of the small plates has the same height size as battery cell 2, and has the smaller width size than the size of the long side in the long side surface of battery cell 2. Two pieces of the small plates are connected by connecting member 5.

Two pieces of the small plates are disposed at both ends of the long side surface of battery cell 2 located at the end. Bolt fastening part 6 which fastens the small plate to a base, is provided at the opposite end to the end surface of battery cell 2 in each of the two pieces of the small plates. The two pieces of the small plates and connecting member 5 are connected with welding or the like. Accordingly, the center part of the large area surface of battery cell 2 at the end does not contact the two small plates of end plate 3. When battery cell 2 is swollen, the center part of the large area surface is swollen.

In the conventional assembled battery, the members, called as end plate 3 or side plate, are disposed at both ends. Such a side plate is one sheet plate having the about same size as the size of battery cell 2. In this case, when battery cell 2 is swollen, the center part which is deformed the most, receives large reaction force.

On contrast, in end plate 3 of the present invention, even in a case where the center part of battery cell 2 is swollen, the center part of battery cell 2 does not contact end plate 3. Then, reaction force due to the swell can be relaxed. As a result, compared with the one sheet end plate, during battery operation, deformation amount of whole assembled battery 1 in a direction where the long side surface thereof extends, can be decreased. As a material of end plate 3, resin or metal can be used, and it is preferable that a bending elastic modulus is equal to or more than 150 GPa. Additionally, as the bolt hole of the bolt fastening part is provided at the end plate, the material of end plate 3 must be easily processed. Considering this point, for example, aluminum may be used.

In order that reaction force due to the swell of battery cell 2 is relaxed, it is preferably that an area ratio of the plurality of small plates 3 of the end plate to the large surface of battery cell 2 is totally equal to or more than 20%. However, metal bands 4c described below, have to interfere with the terminals disposed at the upper part of battery cell 2, and then it is necessary that the small plates of end plate 3 satisfy this.

The pair of the end plates 3 are bound each other by metal bands 4. Metal bands 4 play a role of suppressing whole assembled battery 1 being elongated by reaction force generated from the swells of battery cells 2. For example, metal band 4 is required to have a high longitudinal elastic modulus like a high tensile steel. For example, in FIG. 1B, metal bands 4 are configured in the following. On each of both short side surfaces of battery cell 2, metal band 4a and metal band 4b are disposed at the upper part and the lower part of the side surface respectively. Two pieces of metal bands 4c and two pieces of metal bands 4d, respectively connect the top surfaces and the bottom surfaces of the pair of end plates 3 so as to connect bolt fastening parts 6 of the pair of the end plates 3. Namely, total 8 pieces of the metal bands are disposed at whole assembled battery 1.

When battery cells 2 are swollen in a state where end plates 3 are fastened to the base, the lower sides of end plates 3 are scarcely displaced, and the upper side of end plates 3 are largely displaced.

Figure 2A:
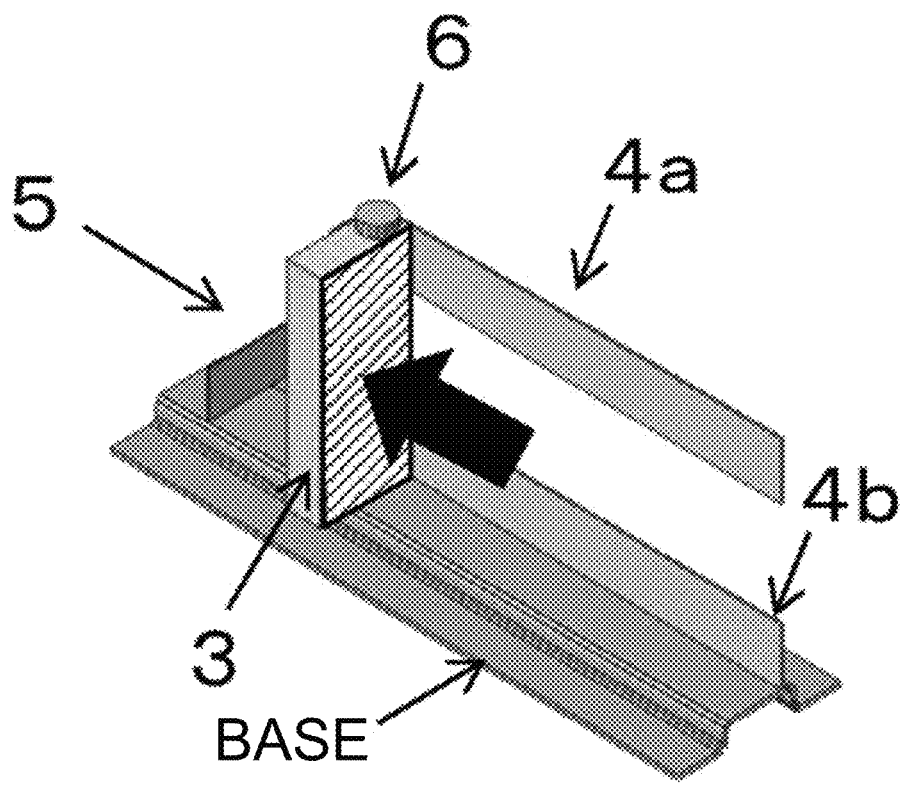
FIG. 2A is a figure showing analyzing example in a case where the battery cells are swollen.
Figure 2B:
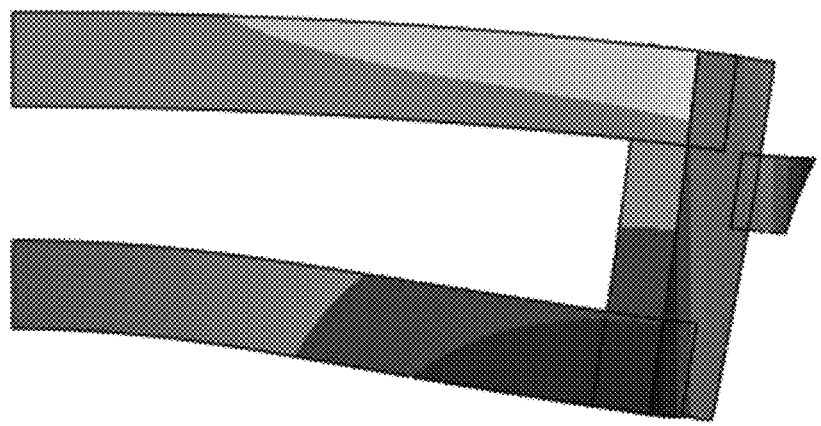
FIG. 2B is a figure showing an end plate, metal bands, and connecting members obtained from analyzing result.

FIG. 2A and FIG. 2B are figures of the analyzing example showing this state. FIG. 2A shows a model used in the analyzing, and shows a state where assembled battery 2 is attached to the base without battery cells 2. Here, assembled battery 1 is symmetrical with respect to central sectional surfaces in the longitudinal and short direction, and ¼ of whole assembled battery 1 is modeled. Under a boundary condition where displacements of the directions perpendicular to the symmetrical surfaces are constrained, the analyzing equivalent to an analyzing by modeling the whole, is carried out.

In this model, in a state where small plate 3 of the end plate is fixed by inserting a bolt into bolt fastening part 6, a load regarded as the reaction force generated due to the swells of battery cells 2 is loaded at the inside surface of small plate 3 of the end plate which contacts battery cell 2. FIG. 2B is a figure showing deformations of small plate 3 of the end plate, metal bands 4, and connecting member 5, obtained from its analyzing.

Since the lower side of small plate 3 of the end plate is fixed by bolt fastening, the displacement thereof is small. As the upper side of small plate 3 of the end plate does not have such a restriction, the displacement thereof is bigger than that of the lower side. In order that this displacement due to the battery cell is suppressed, metal band 4c is preferably provided at least on the top surface of small plate 3 of the end plate. Instead, the top surface of small plate 3 of the end plate may be constrained by a certain way, such as, for example, fastening through providing a base.

Metal band 4d which is connected to the bottom surfaces of the pair of end plates 3, plays a role of making the displacement of assembled battery 1 in the longitudinal direction small. Also, metal band 4d has a function of preventing battery cells 2 from dropping by holding battery cells 2 at assembling assembled battery 1. Regarding this function, instead, the shape of metal band 4b at the lower side of the short side is changed to a sectional L-shape, and each L-shape can hold each of both ends of battery cells 2. When assembled battery 1 is fastened at a certain base by bolts, as the displacement of the lower side of assembled battery 1 is about zero, metal band 4d of the bottom surface may be omitted.

According to the above configuration, the elongation of whole assembled battery 1 can be kept to a small range, even when battery cells 2 are swollen during operation.

Embodiment 2

Figure 3:
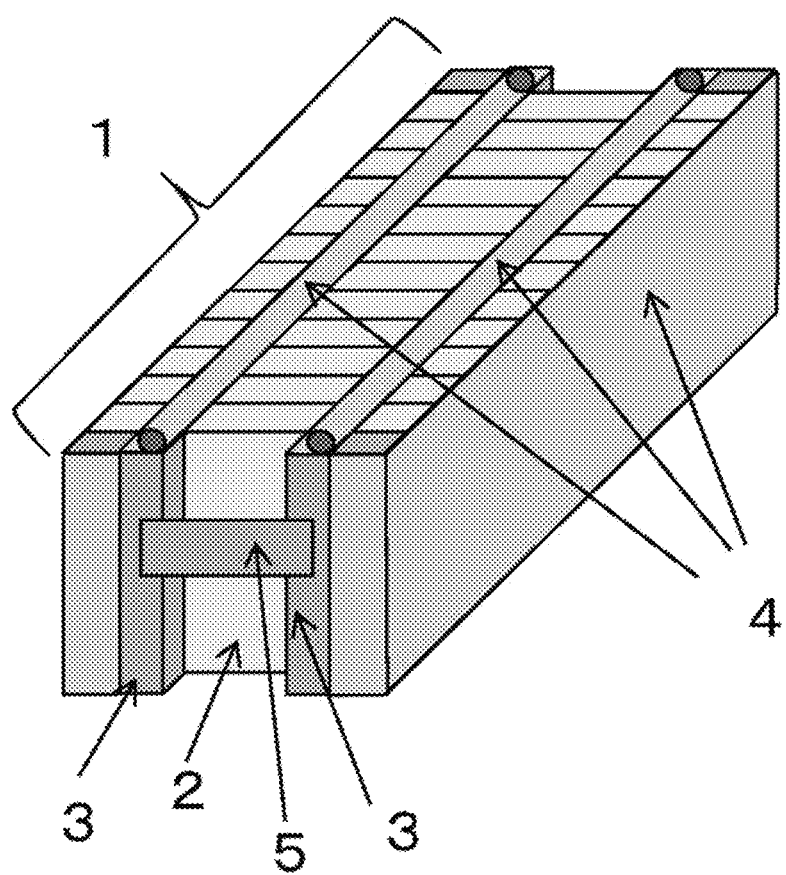
FIG. 3 is a figure showing end plates and connecting member relating to the embodiment 2 of the present invention.

Additionally, for example, metal band 4c and metal band 4d at each of both short side surfaces are not separated. As shown in FIG. 3, the upper one and the lower one may combine into an integral metal band. However, in a case where temperature increase of battery cells 2 during the operation of assembled battery 1 is suppressed, it is preferable that the upper one and the lower one are separated for cooling by blowing the air through gaps between battery cells 2 arranged in series.

Further, in a case where the bottom surfaces of battery cells 2 are cooled, the cooling structure at the short side surface is unnecessary, and the integral metal band is used.

Embodiment 3

Figure 4:
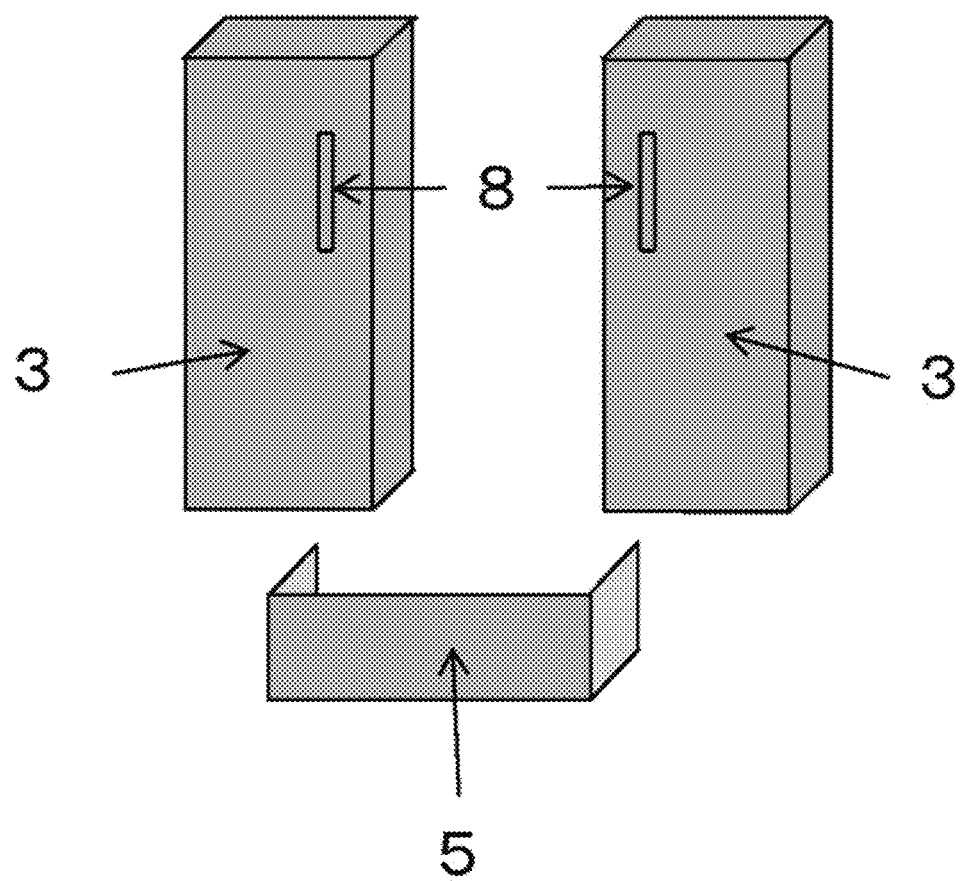
FIG. 4 is a figure showing end plates relating to the embodiment 3 of the present invention.

Regarding two small plates 3 of the end plate at each of both ends in the long side surfaces of assembled battery 1, and connecting member 5, as shown in FIG. 4, connecting member 5 has a C-shape. As shown in FIG. 4, each of small plates 3 of the end plate has connecting member inserting hole 8, and then connecting member 5 is inserted into connecting member inserting holes 8 at assembling.

After attaching assembled battery 1 to the base, connecting member 5 is detached. In a case where end plate 3 is deformed by the reaction force due to the swells of battery cells, in the embodiment 1, the displacement of the connecting member located the outermost, is largest. Namely, when the connecting member is detached, the maximum displacement becomes small, and therefore there is an effect of suppressing the elongation of assembled battery 1.

In a case where one batter cell 2 in assembled battery 1 has failure or breakdown for the worst and is changed, after the C-shaped connecting member is inserted again, assembled battery 1 is disassembled safely and easily. In this structure, since assembled battery 1 can be easily disassembled at least into battery cells 2 and other parts other than them, even in the worst case where abnormality of battery cell 2 occurs, the repair of removing and changing the abnormal battery cell can be carried out comparatively easily.

Otherwise, in an equipment assembling assembled battery 1, when jigs by which connecting member inserting holes 8 as shown in FIG. 4 positions small plates 3 of the end plate, assembled battery 1 can be assembled without the connecting member.

Embodiment 4

Figure 5A:
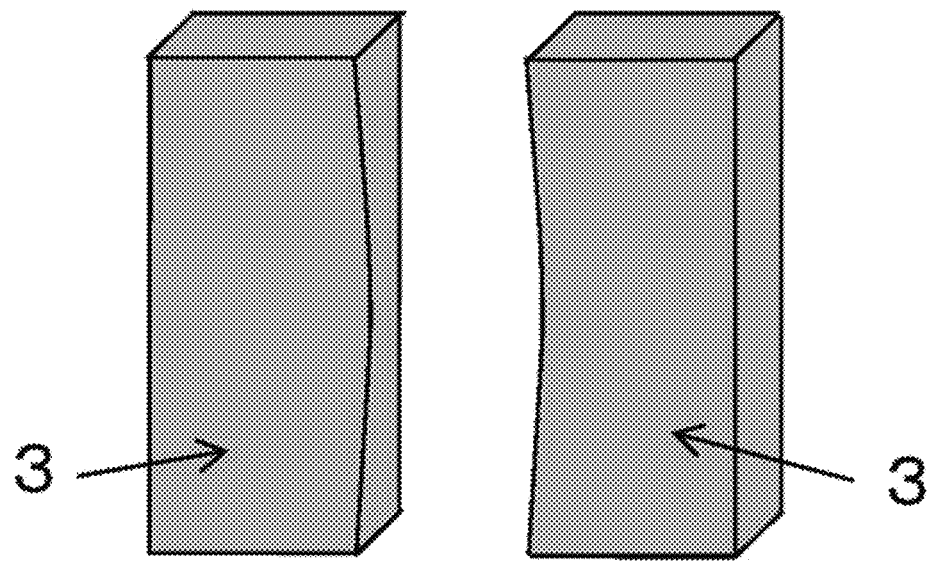
FIG. 5A is a figure showing size change of the end plates.

As shown in FIG. 5A, each of small plates 3 of the end plate, has a recessed shape by scraping the surface opposite to a surface contacting battery cell 2, namely, the surface of the outermost long side surface of assembled battery 1. FIG. 5C shows a side view of the inside of this end plate.

Figure 5B:
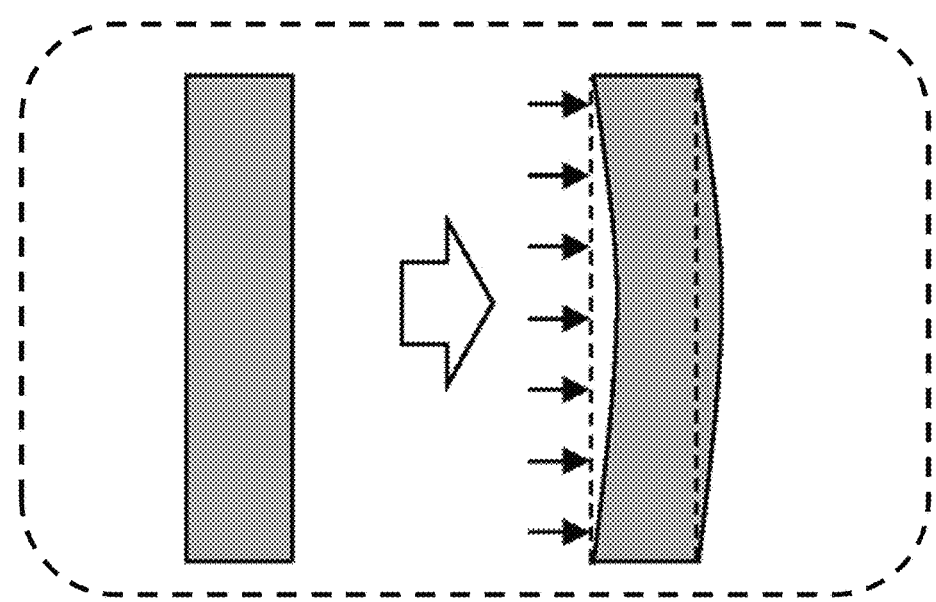
FIG. 5B is a figure showing size change of the end plates.
Figure 5C:
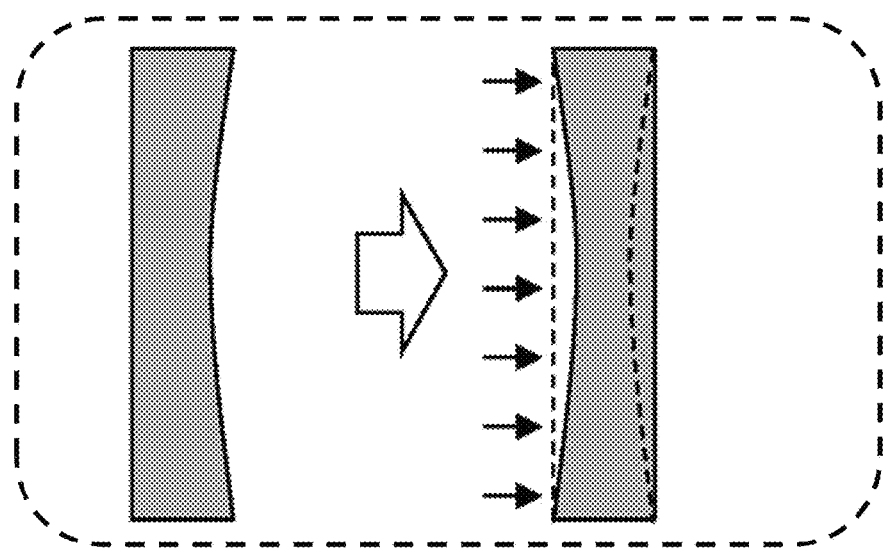
FIG. 5C is a figure showing size change of the end plates.

In the configuration of the embodiment 1 shown in FIGS. 1A to 1C, each of small plates 3 of the end plate has a rectangular parallelepiped shape, and has a rectangular shape in a side view of the inside as shown in FIG. 5B. In this configuration, when small plates 3 of the end plate are pushed by the reaction force due to the swells of battery cells 2, displacements of center parts become the biggest.

On contrast, as shown in FIG. 5C, when each of small plates 3 of the end plate which recesses at the center part, receives the reaction force due to the swells of the cells, displacement of the center part in each of small plates 3 of the end plate becomes big in the same way as FIG. 5B, each of small plates 3 of the end plate is swollen outside. However, the maximum size of assembled battery 1 is unchanged. Namely, as the whole assembled battery, in the outer appearance, the elongation can scarcely occur.

INDUSTRIAL APPLICABILITY

The assembled battery of the present invention, is used for a transportation device such as an electric vehicle, or a hybrid vehicle, a home-use storage battery, and emergency power supply.

REFERENCE MARKS IN THE DRAWINGS

1: assembled battery
2: battery cell
3: end plate
4: metal band
5: connecting member
6: bolt fastening part
8: connecting member inserting hole
9: holder member
10: space maintaining member

The invention claimed is:

1. An assembled battery comprising:
a plurality of battery cells arranged in series;
a pair of end plates sandwiching both ends thereof; and
first metal bands binding the pair of the end plates,
wherein each of the pair of the end plates comprises a plurality of small plates with a space between the plurality of small plates at the respective end,
the first metal bands respectively bind one end small plates of the small plates at one end and the other end small plates of the small plates at the other end, which faces the one end small plates at the one end through the plurality of the battery cells, and
a connecting member on the outer surface of the plurality of small plates extends over the space and connects the plurality of small plates.

2. The assembled battery according to claim 1, wherein inside end parts of the one end small plates and inside end parts of the other end small plates are connected by the first metal bands respectively.

3. The assembled battery according to claim 1, wherein the one end small plates and the other end small plates have the same shape.

4. The assembled battery according to claim 1, wherein the connecting member is removably attached.

5. The assembled battery according to claim 1, wherein each of the one end small plates at one end and each of the other end small plates at the other end corresponding thereto are bound by at least one second metal band in a stacked direction of the plurality of the battery cells at a side surface of a surface where the first metal bands are disposed.

6. The assembled battery according to claim 5, wherein the at least one second metal band includes a plurality of members.

* * * * *